United States Patent [19]
Tsao

[11] 3,900,878
[45] Aug. 19, 1975

[54] MINE RESCUE SYSTEM
[75] Inventor: Carson K. H. Tsao, Braintree, Mass.
[73] Assignee: Raytheon Company, Lexington, Mass.
[22] Filed: Feb. 14, 1973
[21] Appl. No.: 332,532

[52] U.S. Cl............ 343/112 R; 340/18 FM; 340/26; 343/113 R; 343/225
[51] Int. Cl................................................ G01s 3/02
[58] Field of Search.... 343/112 R, 113 R, 225–228; 325/28, 67; 340/26, 18 FM

[56] References Cited
UNITED STATES PATENTS

| | | | |
|---|---|---|---|
| 2,354,887 | 8/1944 | Silverman et al. | 340/18 FM |
| 2,389,241 | 11/1945 | Silverman | 340/18 FM |
| 3,249,943 | 5/1966 | Kaufman | 343/113 R |
| 3,339,204 | 8/1967 | Rail | 343/113 R |
| 3,355,736 | 11/1967 | Perper | 343/113 R |
| 3,529,682 | 9/1970 | Coyne et al. | 340/32 |
| 3,553,698 | 1/1971 | Keller | 343/113 R |
| 3,626,416 | 12/1971 | Rabow | 343/113 R |
| 3,718,930 | 2/1973 | McCullough et al. | 343/112 R |
| 3,831,138 | 8/1974 | Rammner | 340/18 R |

Primary Examiner—Marshall M. Curtis
Attorney, Agent, or Firm—John R. Inge; Joseph D. Pannone; Milton D. Bartlett

[57] ABSTRACT

A mine rescue system for locating trapped miners following a mine disaster. A transmitting device deployed by the trapped miners transmits a signal at a frequency below 3 kHz. The phase of the signal received on the surface is measured with respect to the signal received at an arbitrary reference point and the position on the surface is found where the phase lead is maximized over the reference thus locating the point below which the miners are trapped. The system may be extended to provide for two-way communications between the surface and the mine. Also, the invention encompasses means to guide a rescue drill bit.

8 Claims, 6 Drawing Figures

MINE RESCUE SYSTEM

BACKGROUND OF THE INVENTION

In recent years there has been an increased awareness in mine safety, especially in the coal mining regions. A great deal of this concern is directed towards developing systems to rescue miners once they have been trapped underground by a cave-in or other disaster which isolates them from the surface. In cases of cave-ins, it is essential to quickly establish communications with the trapped miners to facilitate the rescue operations. With no communications between the trapped miners and the rescuers, rescue operations are delayed and hampered a great deal in that frequency the rescues do not know exactly where, below the surface, the miners are trapped and hence much valuable time is wasted in digging and drilling to locations remote from the trapped miners. Previously, it was common practice to put telephone lines into mine shafts at selected locations in the tunnels. However, with telephones only at selected locations, miners could easily be trapped in sections of the mine where there were no telephones. Furthermore, telephone lines were frequently severed by the cave-ins. Hence, it is deemed desirable to construct a system for establishing radio communications between the miners and the surface so that there is no danger of having telephone lines severed. That system should be portable so that the miners may carry it with them into the mines.

Experiments have previously been conducted concerning the propagation of electromagnetic waves through subterranean regions. These studies have indicated that the earth is a sufficiently good conductor to inhibit radio wave transmission above a frequency of several kilohertz. At frequencies below this range, transmission occurs predominantly through the magnetic field rather than actual electromagnetic radiation. Previously proposed mine rescue systems have included systems in which a transmitter was to be carried into the mine which transmits a signal in this low frequency range which will be sufficient in strength to be detected upon the surface. in these systems, the method for detecting the position of the underground transmitter was to move the receiver over the surface until the maximum amplitude of the transmitted signal was found thereby indicating that the transmitter was directly below the surface at the peak amplitude. Another method was to sense the direction of the magnetic field emanating from the surface. In this type of system, an indication that the magnetic field was perpendicular to the surface of the earth was taken as an indication that the transitter was directly below. Both of these types of systems suffered both from problems of noise, which is quite prevalent along the surface of the earth at these frequencies, and from distortions in the magnetic or electromagnetic field patterns caused by the underlying rocks and ferromagnetic materials in the earth's crust. For example, an underlying substrate of ferromagnetic material would frequently cause the magnetic field to be perpendicular to the surface of the earth at places other than those directly above the transmitter thereby giving false indications as to the position of the trapped miners. Also, in the amplitude sensing systems, the presence of the noise introduced a large region of uncertainty as to the location of the transmitter as the position of peak amplitude could be determined only inprecisely because of the great amount of noise present.

SUMMARY OF THE INVENTION

Objections of the prior art may be overcome by providing the combination of means for receiving a signal transmitted from below the earth at a first location on the surface with means for measuring the phase of that signal at a second location with respect to that at the first location. The transmitter source will then be found below the point of maximum phase lead. a circular loop antenna of one or more turns with a radius of two meters or less may be used for the receiving antenna. The transmitting antenna, which converts the transmitter's electrical signal into a substantially magnetic signal, may be the same as the receiving antenna. The phase measuring means may be a combination of receiving means and means to compare the phase of the two signals. Such a system provides a way of determining the shortest distance through the earth to the signal source independent of the amplitude of the signal. In the preferred method of search, the loop antennas should be kept parallel to the ground.

The invention may also be used in guiding a rescue drillling operation. In that case, three mutually perpendicular ferrite rod antennas are mounted in an assembly containing the drill bit. The magnetic field at two of those antennas is a minimum when the drill bit is properly oriented towards the transmitting source.

Also, the invention encompasses a two-way communications system between the mine and the surface of the earth. In the preferred embodiment of such a system, there is a receiver and transmitter at both locations. The surface to mine transmission and reception in the mine employ on-off modulation techniques while the mine to surface transmission and reception on the surface use phase shift keying modulation. The receiver in the mine includes means for producing an audible tone when the signal from the sweface is present. Also, means is included at both locations to inhibit transmission when a signal is being received from the other location. Loop antennas may again be used at both locations. Preselected serial binary coded messages are stored at each location.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENTS

Figure 1:
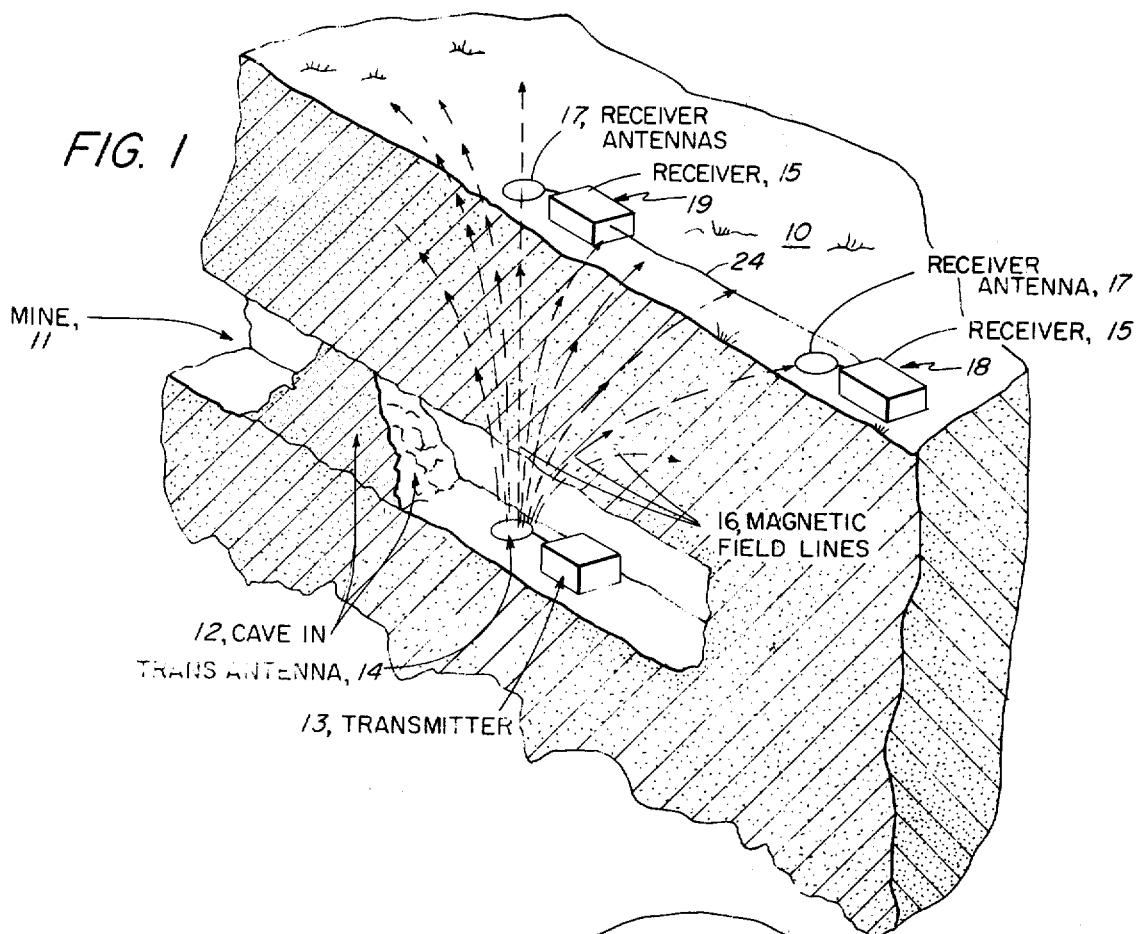
FIG. 1 is a cross-sectional view of a mine rescue system in accordance with the present invention.

FIG. 1 shows a positive detection mine rescue system in accordance with the present invention. In this system, one-way communications is established between trapped miners in the mine shaft 11 and the surface of the earth 10. After the occurrence of a cave-in 12 in the mine shaft 11, the trapped miners lay out the transmitter loop antenna 14 parallel to the surface and turn on the transmitter 13. The transmitter loop antenna 14 in one embodiment has a diameter of approximately two meters. The transmitter 13 preferably emits a continuous sinusoidal signal in the frequency range of 1 to 3 kHz. At these low frequencies, the signal received at the surface of the earth 10 is predominantly the magnetic field emanating from the transmitter loop antenna 14 as depths of mines below the surface are typically much less than a wavelength at these frequencies. The magnetic field lines 16 penetrate through the earth much better than an electromagnetic radiation which would be greatly attenuated by conducting material within the earth. For example, the conductivity of the earth in the United States commonly varies between 1 and 30 millimhos. However, the manetic field is not disturbed by the conducting media and will be received at the surface of the earth undistorted except for distortions caused by underlying ferromagnetic materials such as some types of rock or iron deposits in an unoxidized state.

At the surface of the earth 10 a phase detection method is used to locate the position on the surface 10 below which the immune miners have set up the transimtting 13 and transmitter loop antenna 14. Phase detecting schemes are inherently more immunee to noise then amplitude measurement schemes and hence provide a much more accurate measurement of the location of the trapped miners. Also, phase detection schemes are inherently less sensitive to distortions in the field pattern along the surface of the earth. For example, an underlying region of ferromagnetic material may cause the field to have localized amplitude maxima and minima which may give inaccurate indications of the position of the trapped miners. However, since phase measurements are dependent upon the actual path length between the transmitter and receiver rather than the amplitude of the signal, the expected inaccuracies in measurements are much smaller. Furthermore, in accordance with the present invention, the receiver loops 17, again preferably 2 meters in diameter, are placed parallel to the surface of the earth. It is well known that the noise at the surface of the earth has magnetic components which are predominantly in the same plane as the surface of the earth. Thus, by placing the receiving loop antennas parallel to the surface of the earth, the effects of the surface noise are minimized.

As shown in FIG. 1, two receiver and antenna units 18 and 19 are necessary to implement the phase measurement scheme. A first unit 18 is placed at an arbitrary reference point; a second unit 19 is used to measure the phase of the signal at its position with respect to the phase received at the first unit 18. The phase received by the unit 18 is transmitted to the unit 19 through cable 24 for use as the reference phase by receiver 16. In some embodiments, the cable 24 may be replaced by a telemetry link. For example, the second unit 19 could be airborne by a helicopter to speed up the search operations. When the phase detected by unit 19 is at its maximum lead over the phase of the signal received by unit 18, unit 19 will be located directly above the transmitter 13 and transmitter antenna 14. This result is achieved when the path between unit 19 and transmitter antenna 14 and receiver antenna 17 is the shortest possible path.

Figure 2:
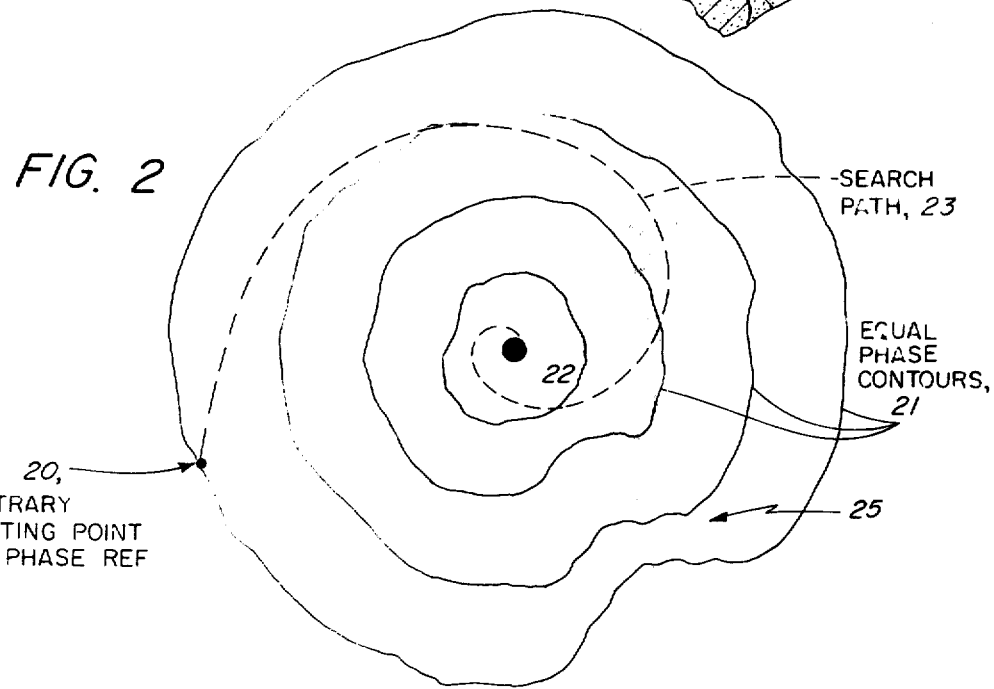
FIG. 2 is a plan view of the equal phase contours from the signal source underground and a possible search path for a mine rescue system.

In FIG. 2 is shown a plan view taken at the surface of the earth 10 showing an example of the equal phase contours in one such mine rescue situation. The first unit 18 is located at the arbitrary starting and phase reference point 20 on one of the phase contour lines 21. By moving along the spiral search path 23, the second unit 19 will move along a path of constantly decreasing phase. The phase along path 23 will have reached its maximum lead over the phase at point 20 when the point 22 is reached which lies directly above the transmitter antenna 14. An underground formation may distort the phase contours such as indicated generally at 25. However, there are no local maximized phase difference points.

In some systems it may be desirable to establish two-way communications between the trapped miners and the rescuers. Separate considerations need to be made for the type equipment used at the surface and type used below the surface in such cases. The signal transmitted from the surface through the earth and into the mine passes through regions of less and less noise as it penetrates further into the ground. Therefore, the carrier to noise ratio on the down-link at the underground reception point is much greater than the carrier to noise ratio on the up-link to the surface since the signal transmitted from the mine shaft passes into regions of increasing noise as it propagates towards the surface.

Figure 3:
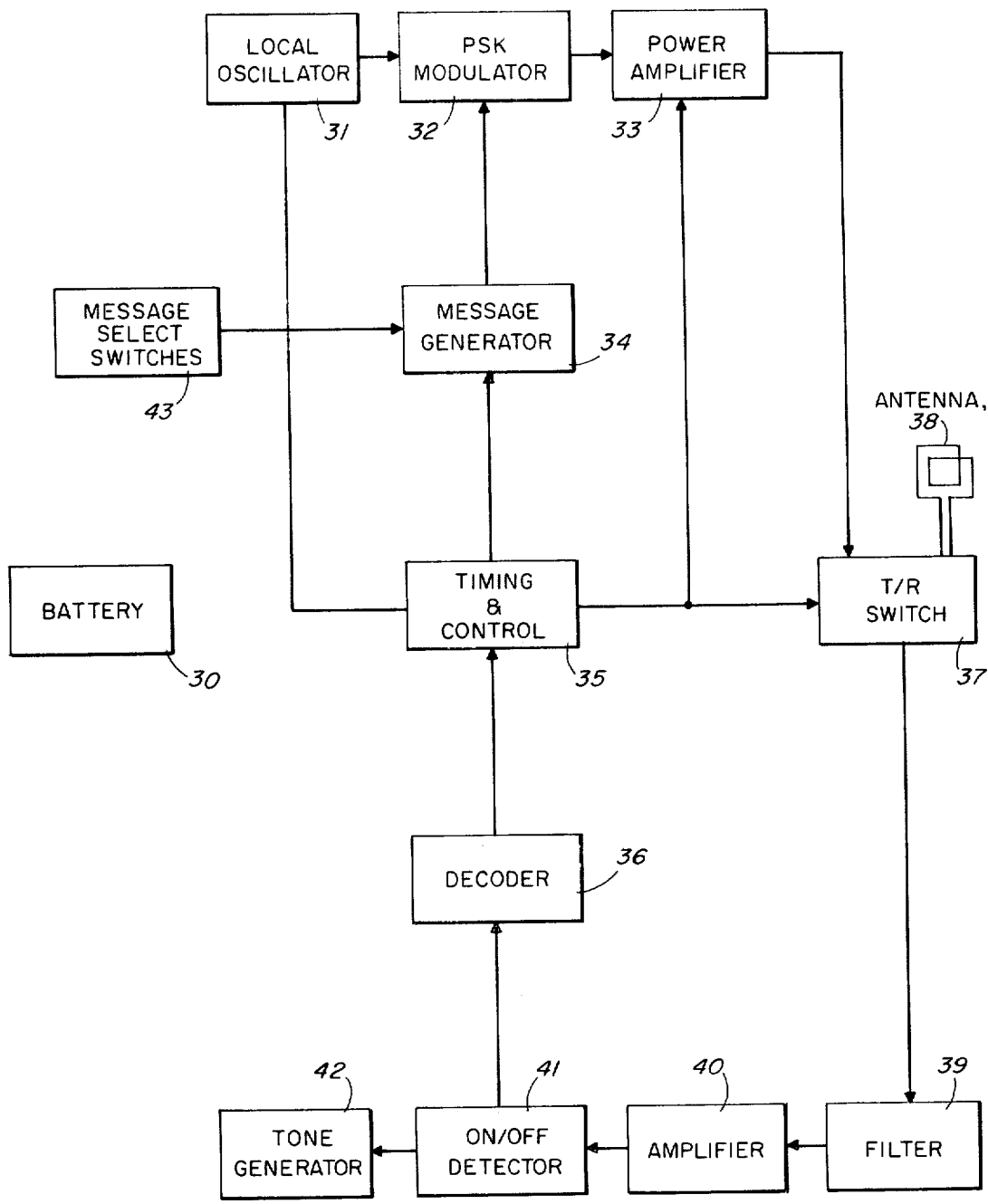
FIG. 3 is a block diagram of the underground terminal in accordance with the present invention.

In FIG. 3 is shown a block diagram of an underground unit capable of two-way communications. A battery 30 supplies power to all of the other functional blocks within the unit. A local oscillator 31 produces a predetermined carrier frequency signal in the range of 1 to 3 kHz. In mine rescue systems in which many underground terminals are deployed throughout the mine, separate frequencies may be assigned to each underground terminal so that each local oscillator 31 produces a frequency unique to that particular unit to permit the units to be distinguished by the units on the surface. The system shown in FIG. 3 operates alternatively in the transmit and receive modes, the switching between which is controlled before establishment of the down-link by timing and control unit 35 along and after establishment of the down-link by the same control unit 35 but with synchronization by decoder circuit 36. The message generator 34 produces a coded message, for example a 5-bit serially transmitted message which may be selected by the miners from among a number of prearranged messages on message select switches 43. In the preferred embodiment, message generator 34 is a read-only memory. In this particular unit, phase shift keying is achieved with the PSK modulator 32 operating on the output of the local oecillator 31. The power amplifier 33 amplifies the modulated signal and couples it through transmit-receive switch 37 to the loop antenna 38 when the unit is in the transmit mode. When the unit is in the receive mode, loop antenna 38 couples the received signals back through transmit-receive switch 37 and through the filter 39. The filter 39 has a bandwidth in the range of 1 to 5 Hz which is sufficiently narrow to filter out most of the noise and yet able to pick out the signal transmitted from the surface which is modulated in and on/off fashion. The output of the filter 39 is amplified by amplifier 40 and coupled from the amplifier 40 to on/off detector 41. The output of the on/off detector 41 controls the decoder 36 which in turn synchronizes the transmit-receive cycle and the tone generator 42. In the preferred embodiment, decoder 36 is a serial-to-parallel data converter coupled to a read-only memory. With some previous training, the miners will be able to distinguish messages sent from the surface which produce predetermined sequences of audio tones emitted by tone generator 42. Alternatively, a group of indicating lights coupled to the tone generator through an audio frequency decoder may be used.

Figure 4:
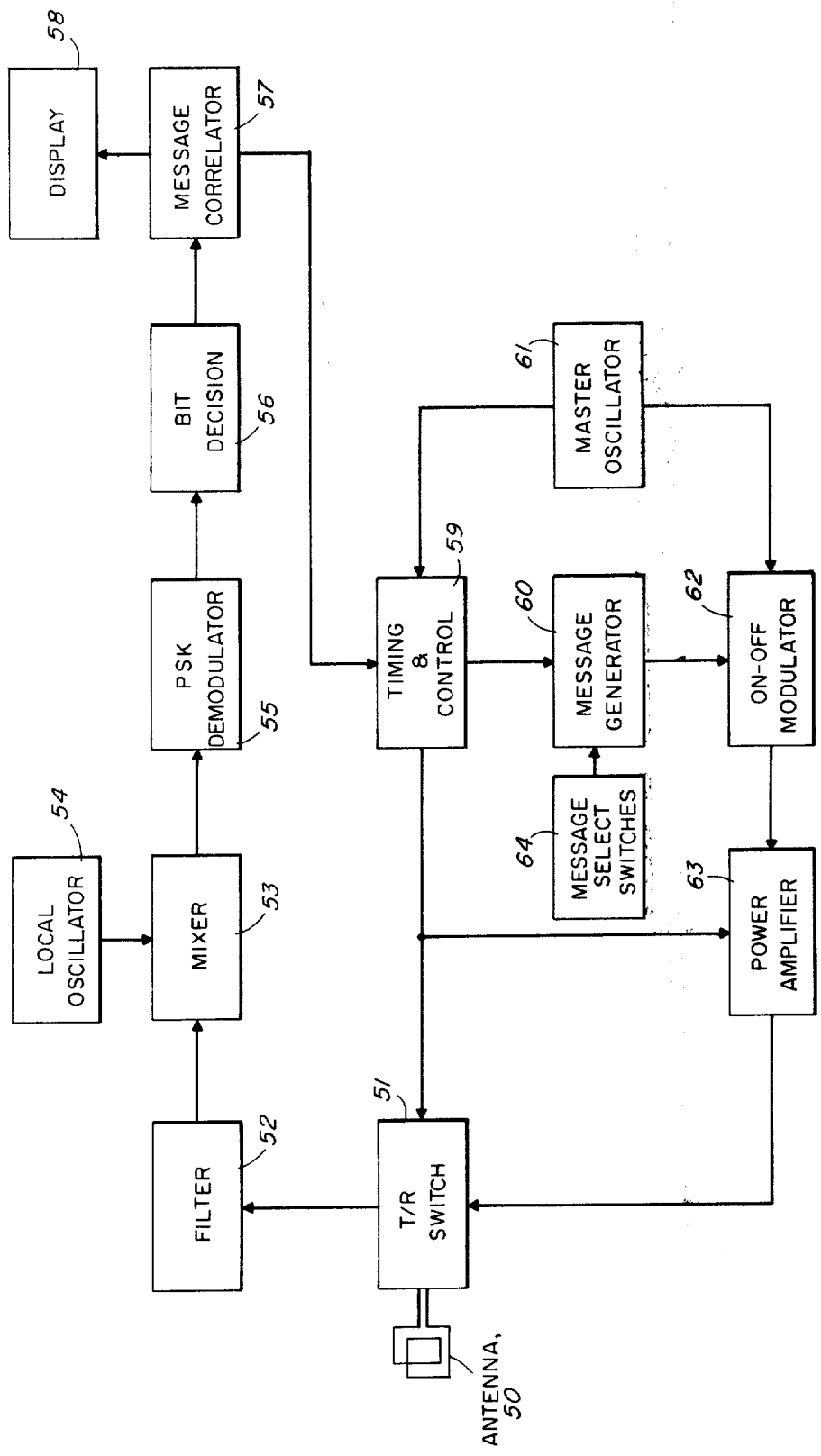
FIG. 4 is a block diagram of the surface terminal in accordance with the present invention.

In FIG. 4 is shown a two-way surface unit constructed in accordance with the present invention. Because of the differences in the up and down link channel characteristics and the possible presence of a plurality of underground terminals, the receiver section of the surface unit in the preferred embodiment is somewhat different than the receiver in the underground unit. Loop antenna 50 of the surface unit is coupled through the transmit/receive switch 51 to a bandpass filter 52. The filter 52 must have enough bandwidth to accept the full range of possible frequencies from the underground terminals as well as for the bandwidth requirements of the phaase shift keying. The output of filter 52 is coupled to a mixer 53, the other input of which is coupled to local oscillator 54. The frequency of the local oscillator 54 is chosen for the particular underground unit frequency to be received. The phase shift keying demodulator 55 and bit decision circuit 56 decode which of the two possible binary states is being transmitted at a particular time during the message. The message correlator 57 decides which of the prearranged messages is being received and couples an indication of this message to display device 58 for display to the rescures. Similar to the decoder 36 of FIG. 3, the message correlator 57, in the preferred embodiment, is a serial-to-parallel data converter coupled to a read-only memory. The output of the message correlator 57 is coupled also to the timing control circuit 59 so that the surface unit and underground terminal transmit and receive cycles may be sychronized. In transmitting back into the mine, the message selected by the rescuers on message select switches 64 is coupled through message generator 60, which is again a read-only memory, to on/off modulator 62 which on/off modulates the output of master oscillator 61. The output of on/off modulator 62 is amplified by power amplifier 63, the output of which is coupled to transmit/receive switch 51 during the transmit cycle. Ten watts of power has been found to be sufficient for both the surface unit and underground unit transmitters for mine depths up to 1500 feet and for ground conductivities as high as 100 millimhos per meter.

Figure 5:
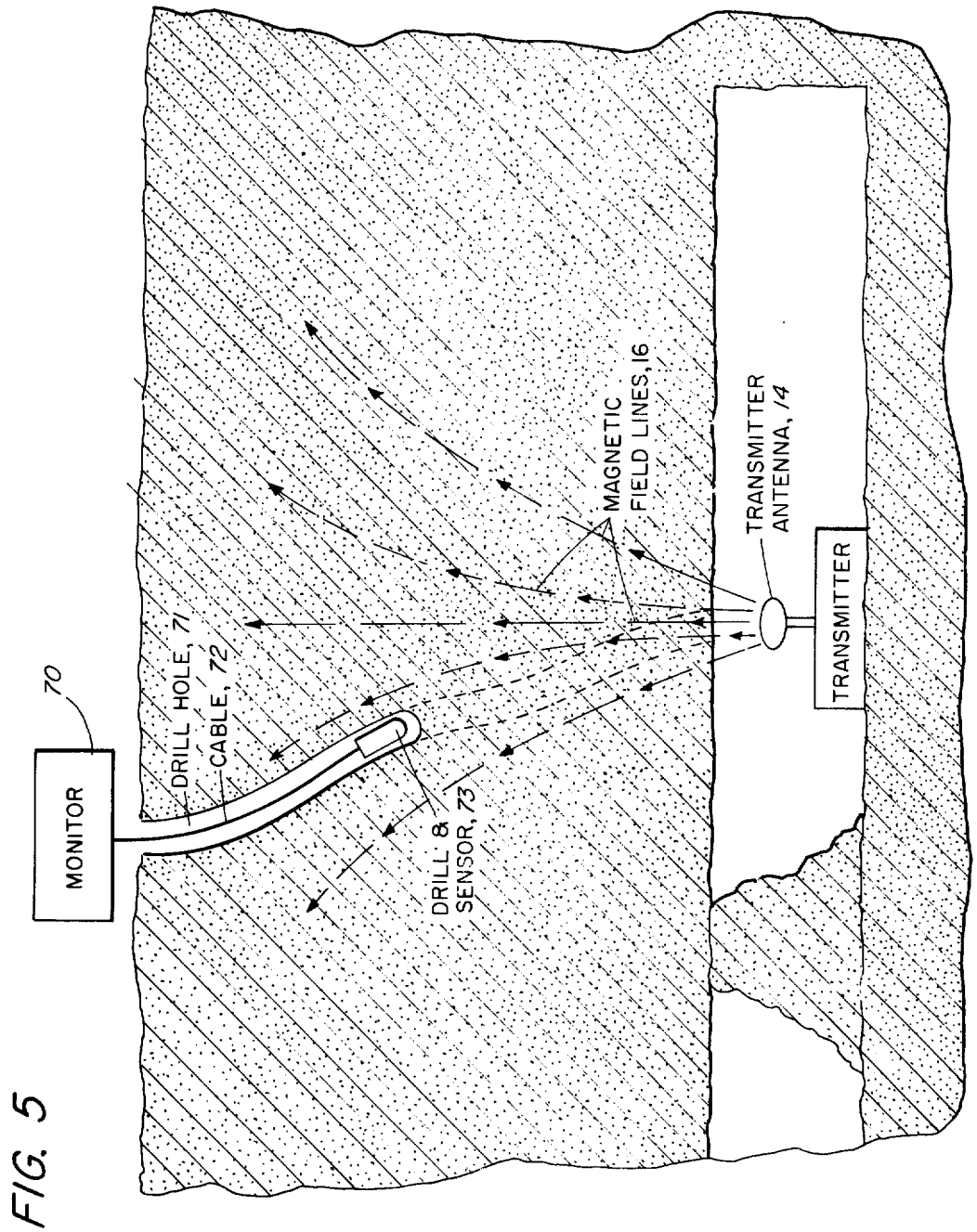
FIG. 5 is a cross-sectional view of a mine rescue operation in accordance with the present invention.

Once the trapped miners have been located and communications established with the surface, a rescue hole may be drilled from the surface to the trapped miners. A system for guiding the drilling of such a hole is shown in FIG. 5. A combined drill and sensor 73 drills a rescue hole 71 controlled through cable 72 by monitor 70. The drill bit is guided by a sensor circuit located in the drill and sensor which is discussed in conjunction with FIG. 6. The sensor and monitor 70 causes the drill to move along the magnetic lines 16. Even if there is a slight error in position made at the start point of the hole, the final destination will still be reached since all of the magnetic field lines emanate from the same location. As the drill approaches the source of the magnetic field lines at the transmitter loop antenna 14 and the signals become stronger, the accuracy of the drilled hole increases so that a high degree of accuracy in the locus of the drill hole 71 will be maintained. Any deviation from the drill and sensor 73 being parallel to the magnetic field lines is immediately corrected so that the drill bit will remain on course.

Figure 6:
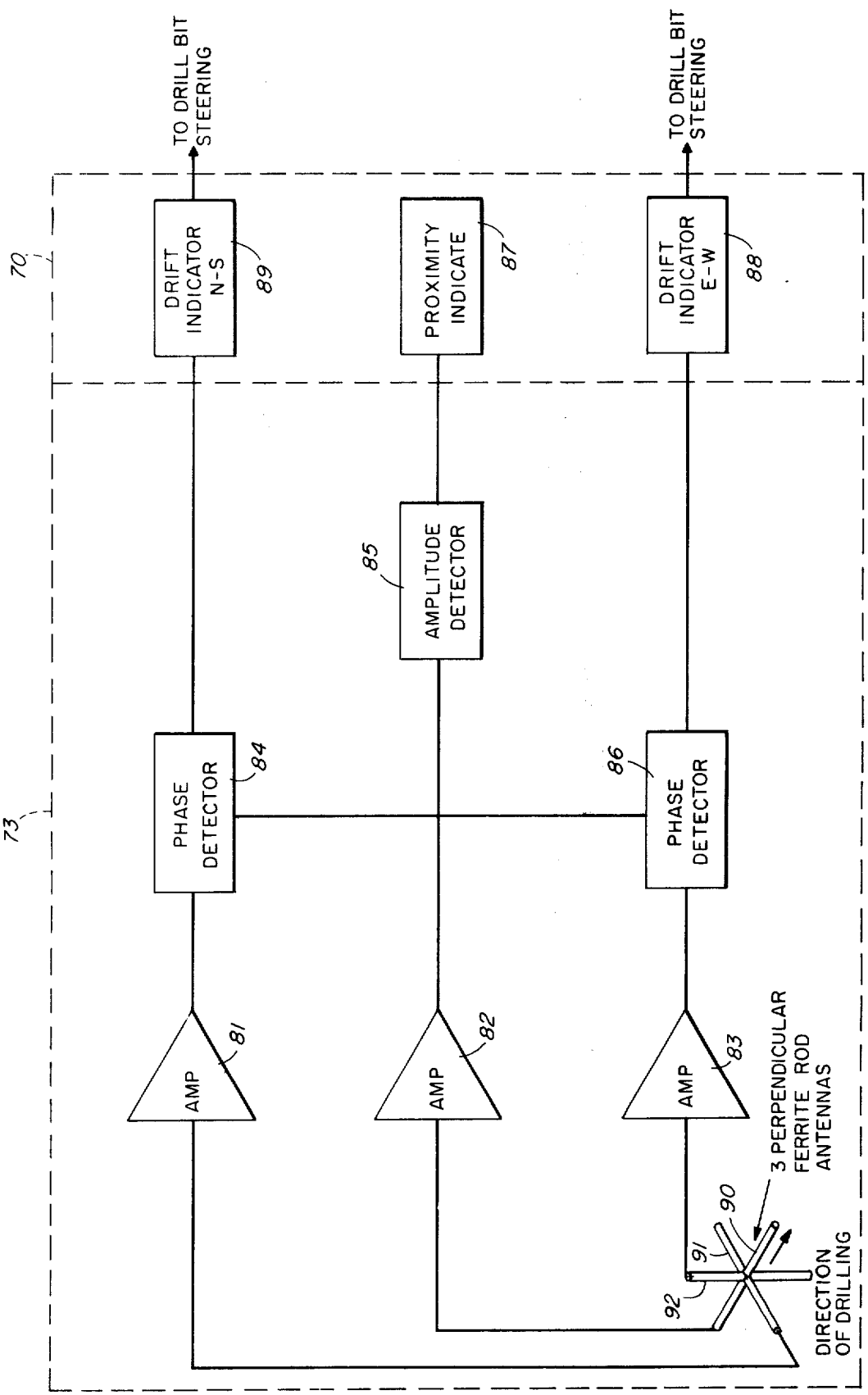
FIG. 6 is a block diagram of a drill guidance system used in the mine rescue operations in accordance with the present invention.

In FIG. 6 is shown the block diagram of the sensor within the drill and sensor unit 73 and localizer monitor 70. The sensor contains three mutually perpendicular ferrite rod antennas 90, 91 and 92. The three ferrite rod antennas are used rather than loop antennas so that the antennas may be mounted in an assembly with the drill bit which requires that the antennas not take up large amounts of space. Rod antenna 90 which is coupled to amplifier 82 is the antenna parallel to the magnetic field lines when the drill is on course, while the antennas 91 and 92 coupled to amplifiers 81 and 83 are perpendicular to the magnetic field lines. When the latter two antennas are perpendicular to the magnetic field lines, the magnetic field sensed by them will be a minimum. Phase detectors 84 and 86 detect when the antennas have been positioned other than perpendicular to the magnetic field lines and indicate this condition to the north-south drift indicator 89 and east-west drift indicator 88. Antenna 90, which is parallel to the magnetic field lines, produces a signal which increases as the drill bit nears the transmitter antenna. Hence, its output is an indication of how much further the drilling must be continued before the trapped miners are reached.

Although a preferred embodiment of the invention has been described, numerous alterations and modifications would be apparent to one skilled in the art without departing from the spirit and scope of the present invention. For example, the system may be used for direction finding purposes other than subterranean searches and searches for trapped miners. The technique is generally applicable in any type of direction finding or search application where the wavelength of the transmitted signal is long compared with the distance between the transmitter and receiver so that the phase may be measured between an arbitrary reference point and a portable receiver. The same system could also be used on shorter wavelengths if some modulation is present on the carrier signal to create a phase reference which would allow a phase measurement to be made between the two receivers. Also, circuit arrangements other than those described for the surface and underground units would be apparent to one skilled in the art without departing from the invention as claimed below.

What is claimed is:
1. In combination:
    means for transmitting a signal through a region of earth, said signal having a frequency below 3 kHz, said transmitting means being located beneath the surface of the earth;
    means for determining the position upon the surface of the earth below which lies said signal transmitting means comprising:

first and second means for receiving said signal upon the surface of the earth, said second receiving means being movable with respect to said second receiving means;

means for comparing the phase of said signal as received at said first receiving means with the phase of said signal as received at said second receiving means; and means for determining the position upon the surface of the earth where the phase of said signal as received at said second receiving means is at a maximum lead over the phase of said signal as received at said first receiving means.

2. The combination of claim 1 wherein said transmitting means comprises:
means for producing an electrical signal; and
means for converting said electrical signal into a substantially magnetic signal through the earth.

3. The combination according to claim 2 wherein said converting means comprises a loop antenna.

4. The combination according to claim 3 wherein said loop antenna has a radius of two meters or less.

5. A system for locating the position on the surface of the earth directly below which lies a source of magnetic signals comprising in combination:

means for producing an electrical current, the frequency of said current being less than 3 kHz and said producing means being located below the surface of the earth;

a loop antenna coupled to said current producing means for transmitting said current as a magnetic signal, the plane of said antenna being substantially parallel to the surface of the earth;

first and second means for receiving said signal once transmitted, said first and second receiving means being located on the surface of the earth and each of said receiving means including a loop antenna substantially parallel to the surface of the earth, said first and second receiving means being movable with respect to one another; and means for comparing the phase of said signal as received at said first receiving means with the phase of said signal as received at said second receiving means, said loop antenna coupled to said current producing means being directly below said loop antenna coupled to said second receiving means when said phase at said second receiving means is at maximum lead over said phase at said first receiving means.

6. The combination according to claim 5 wherein said first receiving means is located at a stationary position while said second receiving means is capable of being transported.

7. The combination according to claim 6 further comprising means coupled to said first receiving means for coupling the signal as received by said first receiving means to said comparing means, said comparing means being located adjacent to said second receiving means.

8. A system for locating trapped miners by communication between the surface of the earth to a region in the interior of the earth where the miners are trapped wherein signals are transmitted and received in both locations comprising in combination:

means located below the surface of the earth for producing a first modulated signal, the phase of said first modulated signal being varied in accordance with a first preselected message, said first preselected message comprising a sequence of binary numbers;

first receiving means located adjacent to said means for producing said first modulated signals for receiving signals transmitted from the surface of the earth into said region, said first receiving means including means for producing an audible tone when signals transmitted from said surface are received at said first receiving means;

means coupled to said means for producing said first modulated signals and to said first receiving means for inhibiting said means for producing said first modulated signal when signals transmitted from said surface are received at said first receiving means;

first antenna means coupled to said means for producing said first modulated signals and to said first receiving means;

means located on said surface for producing a second modulated signal, said second modulated signal being switched on and off in accordance with a second preselected message, said second preselected message comprising a sequence of binary numbers;

second receiving means located adjacent to said means for producing said second modulated signal for receiving signals transmitted to said surface from said region, said second receiving means including means for determining which of said first preselected messages is being transmitted from said region;

means coupled to said means for producing said second modulated signal and to said second receiving means for inhibiting said means for producing said second modulated signal when signals transmitted from said mine are present; and second antenna means coupled to said means for producing said second modulated signal and said second receiving means.

* * * * *